United States Patent [19]

Higashiyama et al.

[11] Patent Number: 5,131,948
[45] Date of Patent: Jul. 21, 1992

[54] ANTICORROSION COATING COMPOSITION

[75] Inventors: Takao Higashiyama; Michiaki Nakazato, both of Yokohama, Japan

[73] Assignee: Nippon Dacro Shamrock Co., Kanagawa, Japan

[21] Appl. No.: 734,582

[22] Filed: Jul. 23, 1991

[30] Foreign Application Priority Data

Jul. 27, 1990 [JP] Japan ................ 2-200308

[51] Int. Cl.$^5$ ................ C09D 5/10
[52] U.S. Cl. .............. 106/14.14; 106/14.21; 252/389.5; 252/389.52; 252/389.53
[58] Field of Search .......... 106/14.11, 14.13, 14.14, 106/14.21; 252/389.5, 389.52, 389.53

[56] References Cited

U.S. PATENT DOCUMENTS 4,266,975  5/1981  Higashiyama et al. ........ 106/14.21
4,626,453 12/1986  Koltz et al. .................... 106/14.21
4,791,008 12/1988  Koltz et al. .................... 106/14.21

Primary Examiner—William R. Dixon, Jr.
Assistant Examiner—Anthony J. Green
Attorney, Agent, or Firm—Webb, Burden, Ziesenheim & Webb

[57] ABSTRACT

An improved anticorrosion coating composition is disclosed. The composition is characterized in that in the known anticorrosion coating composition comprising a chromic acid compound or a chromic acid compound and a boric acid compound, a powder of zinc, aluminum of an alloy of a mixture thereof, a (poly)glycol compound and solvent, a part of chromic acid compound ingredient is replaced by a water-soluble nickel and/or cobalt compound. The composition exhibits a better corrosion protection performance in more severe corrosion environment than the known anticorrosion coating composition with lesser content of harmful hexavalent chromium.

12 Claims, No Drawings

ANTICORROSION COATING COMPOSITION

FIELD OF THE INVENTION

This invention relates to an anticorrosion coating composition for metals.

BACKGROUND OF THE INVENTION

Various anticorrosion coating compositions for metals, especially iron and steel, are known. One of the most effective is a composition comprising chromic anhydride or chromic anhydride and a boric acid compound, powder of a base metal (usually zinc or aluminum), a pH regulator (oxide or hydroxide of a metal), a low-molecular weight oxohydroxyether or glycol and water and/or an organic solvent.

This composition is usually supplied to users in the form of a combination of a first composition comprising chromic anhydride and optionally boric acid compound, a pH regulator and water and/or water-miscible organic solvent and a second composition comprising a metal powder and low-molecular weight oxo-hydroxyether or glycol (propylene glycol, for instance). The two are mixed together prior to use and the mixture is applied to the surface of metals to a predetermined thickness (to an extent that a coating layer having a thickness of 1 micron or more is finally formed) and subjected to the heat treatment at not lower than 200° C. for at least 0.2 sec.

This composition exhibits an excellent effect for preventing corrosion of iron and steel against salt water, which is superior to zinc plating. Also this composition exhibits excellent performance over a long period of time in the continuous salt spray test. However, even this composition does not always perform satisfactorily in stricter accelerated tests such as the complex cycle test, which is often employed recently. Said complex accelerated test comprises a salt spray test, a moistening and drying test, etc. conducted in combination. That is, the above composition is not sufficient in very severe environments, where superior corrosion prevention performance is expected.

Although the mechanism of corrosion prevention of this composition is not entirely understood, it is surmised that chromium oxides (reduction products of chromic acid, mainly $Cr_2O_3$) act as a binder (matrix) for the metal powder to form a coating layer on the surface of the substrate metal and passivate and stabilize the metal surface. Also the matrix has slight electric conductivity and hexavalent chromium remaining in the chromium oxides maintains the metal powder active and thus they causes the metal powder to exhibit sacrificial protective activity. It is known that the protective effect of this composition in salt water environments can be enhanced by increasing the content of the chromium oxides in the coating layer. However, if a larger amount of hexavalent chromium is used, this is a problem from the viewpoint of environmental pollution. That is, in the courses of production and disposal, it is required to convert the hexavalent chromium to harmless substances by reduction and this leads to increased manufacturing and disposal costs.

In order to create an improved anticorrosion coating composition having superior anticorrosion protective performance under severe salt corrosion environments without using a larger amount of chromium compounds, we prepared a number of compositions of various metal compounds and conducted tests on corrosion prevention performance with respect to the prepared compositions. Out of the tested metallic compounds, we found compounds of nickel (Ni) and/or cobalt (Co) to be effective and created an anticorrosion coating composition by addition of compounds of these metals. Compared to the known composition, the composition is less harmful to the environment, has a dramatically improved anticorrosion performance in salt water environments and exhibits stabilized corrosion prevention effect in freshwater environments.

DISCLOSURE OF THE INVENTION

The present invention provides an anticorrosion coating composition comprising 1–12% of a nickel salt and/or a cobalt salt, 1–12% of water-soluble chromic acid compound, 0–9% of a boric acid compound, 0–4% of a pH regulator, 10–40% of zinc powder, aluminum powder or a mixture of these two, a zinc alloy powder, an aluminum alloy powder or a mixture of these two, 7–30% of a low molecular weight glycol or oxohydroxyether, 0–4% of a surfactant and the balance of water and/or a water-miscible organic solvent.

The nickel salt and cobalt salt usable in the present invention can be chloride, sulfate, nitrate, carbonate, acetate, etc., although nitrate and carbonate are preferred.

In the composition of the present invention, nickel and cobalt are present in the binder matrix formed by the chromic acid compound and boric acid compound and act so as to cause a more resistive stable passivated film to be formed on the surface of the substrate metal when the acid compounds form a passivated film on the surface of a metal substrate and powder of zinc, aluminum, etc. This stabilizes the surface of the metal substrate and allows the powder of zinc, aluminum, etc. to exhibit sacrificial corrosion prevention effect. Thus corrosion prevention performance is dramatically improved.

It is advantageous to supply the composition of the present invention as a combination of a mixture of the nickel salt and/or cobalt salt, chromic acid compound, boric acid compound, the pH regulator and water and/or the organic solvent (the first composition) and another mixture of the metal powder and the low molecular weight glycol or oxohydroxyether (the second composition) contained in two separate containers to be combined and mixed by the user before the composition is used.

The amount ratio of the first composition and the second composition is preferably 50–70 wt % of the first composition to 50–30 wt % of the second composition from the viewpoint of distribution of the components and ease in handling of the respective compositions.

In the composition of the present invention, the amount of the nickel and/or cobalt salt (hereinafter collectively called metal compounds) must be more than 0.01 in the gram ion equivalent ratio to the amount of the chromium ions. Otherwise, the effect of the metal compounds is not manifested. On the other hand, if this ratio is not less than 1.0, the formation of the matrix by chromic acid compound is hindered and the adherence of the coating layer is impaired. The preferred ratio is 0.1 to 0.5. The content of the nickel and/or cobalt compound (metal compounds) in the total composition is 1–12 wt %.

In the composition of the present invention, water-soluble salts of chromic anhydride, chromic acid, etc. and dichromate salts can be used as the water-soluble chromic acid compound. Although chromic anhydride is generally easily usable and preferred, calcium chromate, magnesium chromate, zinc dichromate, potassium dichromate, sodium dichromate, magnesium dichromate, calcium dichromate, etc. are also usable.

Water-soluble chromic acid compound is the main ingredient of the composition of the present invention and it is contained in the composition in an amount of 1–12 wt %. At least 1 wt % is required and the upper limit is about 12 wt % in consideration of the contents of the other ingredients.

In the composition of the present invention, a part of the chromic acid compound can be replaced with boric acid compound. It is suitable to use commercially available orthoboric acid as the boric acid compound. Metaboric acid, tetraboric acid, etc. can be used as desired. Boron oxide can be used instead of boric acid. Boric acid or boron oxide (hereinafter called boric acid compound) should preferably be contained in an amount of 10–75 wt %, supposing that the total amount of the boric acid compound and the chromic acid compound is 100 wt %. Therefore, the boric acid compound content is 0–9 wt %.

The composition of the present invention contains powder of a metal having a negative standard electrode potential the absolute value of which is greater than that of iron. Practically, powders of zinc and aluminum and a mixture or an alloy of the two are used. The metal powder preferably consists of minute flakes having a thickness of 0.1–0.5 micron and a length of not more than 15 micron.

In the composition of the present invention, the ratio of the chromic acid compound and the boric acid compound (hereinafter collectively called acid compound) to the metal powder must be not less than 0.05 in weight. If it is smaller than 0.05, the amount of the acid compound is insufficient to fill the void between the metal particles so as to bind the particles together and to make them to adhere to the surface of the metal substrate, and thus a coating layer strongly adhering to the substrate cannot be obtained. To the contrary, if the ratio is in excess of 1.0, the metal powder is surrounded by too large an amount of the acid compound and thus its sacrificial corrosion prevention effect cannot be exhibited. Preferably, this ratio is 0.08–0.5. Therefore, the content of the metal powder in the total composition is 10–40 wt %.

The low molecular weight glycols used in the composition of the present invention include mono(lower alkylene) glycol such as ethylene glycol, propylene glycol, oligo(lower alkylene) glycol such as diethylene glycol, dipropylene glycol, triethylene glycol, tripropylene glycol, oligo(lower alkylene) oligo(lower alkyl)ether such as dipropylene glycol monomethylether, their homologs and their mixtures. Diacetone alcohols and low molecular weight oxohydroxyethers can be also used for glycols. These substances work as reducing agents upon the chromic acid compound so as to convert it to chromium oxide and also play a role of preventing the boiling vaporization of the solvent when the composition applied on the metal surface is baked so as to form a coating layer, and thus contribute to the formation of a uniform protective layer. If the amount of this low molecular weight ingredient is too small, the above-described effect cannot be well exhibited. The amount of this ingredient in the composition of the present invention is selected in the range of 7–30 wt % in view of easiness in handling of the second sub-composition.

The final composition in accordance with the present invention exhibits the best storage stability at pH's between 3.0 and 6.0. Therefore, when the water-soluble chromic acid compound is strongly acidic, a pH regulator, selected from a group consisting of oxides and hydroxides of lithium and other metals belonging to group IIa and groups of a larger number in the periodic table, is added. Examples of such metals are strontium, calcium, barium, magnesium, zinc and cadmium. In case when the composition is supplied in two containers, the pH regulator is added to the first composition. The necessary amount thereof is up to 4 wt % in the total composition. The pH regulator is used in order to prevent an explosive reaction of the metal powder and the acid component when the two subcompositions are combined and thus contributes to formation of a smooth well-adhering coating layer and prevention of darkening of the coating layer. If the chromic acid compound is not strongly acidic, the pH regulator is not required.

In the composition of the present invention, a nonionic surfactant, especially an alkylphenol polyethoxy adduct can be added as a wetting agent in order to assist dispersion and suspension of the metal powder. The amount thereof is up to 4 wt %.

In the present invention, the finally mixed composition contains 10–40 wt %, preferably 15–30 wt % of the metal powder, 1–12 wt %, preferably 2–8 wt % of the acid compound, 1–12 wt %, preferably 1–6 wt % of the metal compound and 7–30 wt %, preferably 12–20 wt % of the glycol compound and the balance comprises the optionally added pH regulator and other additives and water and/or water-miscible organic solvent.

The composition of the present invention is preferably supplied as a combination of the first composition comprising the acid compound, the metal compound, and the optionally added pH regulator dissolved in water and/or a water-miscible organic solvent and the second composition comprising the metal powder and the glycol compound, which are finally mixed prior to use.

The substrate metal to be coated is usually degreased by an alkali cleaner, chlorinated hydrocarbon vapor phase cleaner, etc. beforehand. Application can be effected by spraying, roll-coating, dip coating, a method in which the substrate is dipped in the composition and the excess liquid is removed by centrifuging, brushing, etc.

The substrate coated with the composition is baked in a hot air circulation oven (IDG combustion furnace or electrically heated furnace), far infrared ray furnace, infrared ray furnace, high frequency induction heating furnace or any combination thereof, at a temperature not lower than 180° C. for at least 0.2 sec, preferably at a temperature not lower than 200° C. for at least 0.5 sec, more preferably at a temperature not lower than 260° C. for at least 0.5 sec. Coated and heat-treated metal substrates are allowed to spontaneously cool or forcibly air-cooled to room temperature. If necessary, coating and heat-treatment are repeated.

SPECIFIC DESCRIPTION OF THE INVENTION

Now the invention will be described in detail by way of working examples. In the working examples, the test specimens were tested by the following corrosion test and in accordance with the following evaluation standard.

1) Salt spray test (SST)

Test specimens were tested by the neutral salt spray test stipulated in JIS-Z-2371. The test specimens which underwent the test were evaluated in accordance with the following rating:

5 points: No red rust observed.
4 points: Less than 10 pinholes producing red rust observed.
3 points: Rust spots spread and some flow of rust observed.
2 points: Marked flow of rust observed.
1 point: Entire surface covered by red rust.

2) Complex cycle test A (CCT-A)

This is an accelerated test comprising 1 cycle (90 min) of:

| | |
|---|---|
| Immersion in 5% NaCl solution (40° C.) | 1 min |
| Drying (60° C.) | 60 min |
| Moistening (RH 50%-95% over) | 29 min |
| 1 Cycle | 90 min |

3) Complex cycle test B (CCT-B)

This is an accelerated test comprising 1 cycle (4 hrs) of:

| | |
|---|---|
| In RH 30% at 60° C. | 2.0 hr |
| In RH 30% to 95% at 60° C. | 0.5 hr |
| In RH 95% at 60° C. | 1.0 hr |
| In RH 95% to 30% at 60° C. | 0.5 hr |
| 1 cycle | 4.0 hr |

The above cycle was repeated 6 times a day and the test specimens were immersed in a 5% NaCl solution at ambient temperature for 10 minutes once a day.

The test specimen was a 0.8 mm × 70 mm × 150 mm mild steel sheet.

EXAMPLE 1

A solution of 6.90 wt % of chromic anhydride and 2.46 wt % of cobalt carbonate in deionized water was prepared. This is designated as the first composition. A dispersion of 60 parts of metallic zinc flake (0.1–0.3 micron in thickness and about 1.5 micron in average maximum length) in propylene glycol containing 0.2 parts of a surfactant (alkylphenol polyethoxy adduct) to make 100 parts by weight was prepared. This is the second composition.

A 58:42 (by weight) mixture of the first composition and the second composition was prepared by pouring the former into the latter under slow agitation and the mixture was stirred overnight. In this composition, the concentration of chromic anhydride was 4 wt % and the gram ion equivalent ratio Cr:Co was 1:0.3. The mixture was applied to the surface of a mild steel sheet, which had been well polished with "Scotch Bright Very Fine" polishing cloth (supplied by 3M Company), and the coated sheet was baked in an electrically heated hot air circulation furnace in such a manner as to heat the sheet to 300° C. and maintain it at this temperature for 4 min. Then the sheet was allowed to cool to room temperature. The thickness of the formed coating film was 1 micron and the coating weight was 30 mg/dm².

EXAMPLE 2

Using 2.69 g of nickel chloride instead of cobalt carbonate, the procedures of Example 1 were repeated and coated specimens were prepared.

EXAMPLE 3

Using 1.84 g of nickel carbonate instead of cobalt carbonate and adding calcium oxide as a pH regulator in an amount of 0.5 wt % of the total composition, the procedures of Example 1 were repeated and coated specimens were prepared.

EXAMPLE 4

Adjusting the amount of cobalt carbonate so that the Cr:Co gram ion ratio in the final composition was 1:0.5, the procedures of Example 1 were repeated and coated specimens were prepared.

EXAMPLE 5

Adjusting the amount of cobalt carbonate so that the Cr:Co gram ion ratio in the final composition was 1:0.1, the procedures of Example 1 were repeated and coated specimens were prepared.

EXAMPLE 6

Adjusting the amount of cobalt carbonate so that the Cr:Co gram ion ratio in the final composition was 1:0.2, the procedures of Example 1 were repeated and coated specimens were prepared.

EXAMPLE 7

A solution of 5.17 wt % of chromic anhydride, 1.72 wt % of orthoboric acid and 6.02 wt % of cobalt nitrate (hexahydrate) in deionized water was prepared. This is the first composition. A dispersion of 50 parts of a 80:20 mixture of metallic zinc flake and metallic aluminum flake in dipropylene glycol monomethylether containing 0.3 part of a surfactant (alkylphenol polyoxyethylene) to make 100 parts by weight was prepared. This is the second composition.

A 58:42 (by weight) mixture of the first composition and the second composition was prepared by pouring the former into the latter under slow agitation and the mixture was stirred overnight. In this composition, the concentration of chromic anhydride was 3% and the gram ion equivalent ratio Cr:Co was 1:0.4. The mixture was uniformly applied on the surface of a mild steel sheet, which had been washed with an alkali solution and well polished with "Scotch Bright Very Fine" polishing cloth (supplied by 3M Company), by means of a bar-coater, and the coated sheet was baked in an electrically heated hot air circulation furnace in such a manner as to heat the sheet to 290° C. and maintain it at this temperature for 8 min. Then the sheet was allowed to cool to room temperature. The thickness of the formed coating film was 1 micron and the coating weight was 30 mg/dm².

EXAMPLE 8

Adjusting the amount of calcium oxide as a pH regulator so that it was 0.5 wt % in the final composition, the procedures of Example 7 were repeated and coated specimens were prepared.

EXAMPLE 9

A solution of 5.17 wt % of chromic anhydride, 1.72 wt % of orthoboric acid and 4.51 wt % of cobalt nitrate (hexahydrate) in deionized water was prepared. This is the first composition. A dispersion of 50 parts of a 80:20 mixture of metallic zinc flake and metallic aluminum flake in dipropylene glycol containing 0.3 part of a surfactant (alkylphenol polyoxyethoxy adduct) to make 100 parts by weight was prepared. This is the second composition.

A 58:42 (by weight) mixture of the first composition and the second composition was prepared by pouring the former into the latter under slow agitation and the mixture was stirred overnight. In this composition, the concentration of chromic anhydride was 3 wt %, that of orthoboric acid was 1 wt % and the gram ion equivalent ratio Cr:Co was 1:0.3. The mixture was applied to the surface of a mild steel sheet, which had been well polished with "Scotch Bright Very Fine" polishing cloth (supplied by 3M Company), and the coated sheet was baked in an electrically heated hot air circulation furnace in such a manner as to heat the sheet to 290° C. and maintain it at this temperature for 8 min. Then the sheet was allowed to cool to room temperature. The thickness of the formed coating film was 3 micron and the coating weight was 100 mg/dm$^2$.

COMPARATIVE EXAMPLE 1

The procedures of Example 1 were repeated without using cobalt compound and coated specimens were prepared.

COMPARATIVE EXAMPLE 2

The procedures of Example 7 were repeated without using cobalt compound and coated specimens were prepared.

The thus prepared specimens were subjected to the above-described tests. The results are shown in the following table.

TABLE

| Specimen | Metal Comp. | Me/Cr | SST | CCT-A | CCT-B |
| --- | --- | --- | --- | --- | --- |
| Comp. Ex. 1 | | | 5 | 1 | 1 |
| Comp. Ex. 2 | | | 5 | 1 | 2 |
| Example 1 | CoCO$_3$ | 0.3 | 5 | 4 | 5 |
| 2 | NiCl$_2$ | 0.3 | 5 | 3 | 4 |
| 3 | NiCO$_3$ | 0.3 | 5 | 5 | 5 |
| 4 | CoCO$_3$ | 0.5 | 5 | 5 | 5 |
| 5 | CoCO$_3$ | 0.1 | 5 | 2 | 3 |
| 6 | CoCO$_3$ | 0.2 | 5 | 3 | 4 |
| 7 | Co(NO$_3$)$_2$ | 0.4 | 5 | 5 | 5 |
| 8 | Co(NO$_3$)$_2$ | 0.4 | 5 | 5 | 5 |
| 9 | Co(NO$_3$)$_2$ | 0.3 | 5 | 5 | 5 |

What is claimed is:

1. An anticorrosion coating composition for metal comprising 1-12 weight percent of at least one metal salt selected from the group consisting of nickel salt and cobalt salt, 1-12 weight percent of a water-soluble chromic acid compound, 0-9 weight percent of a boric acid compound, 0-4 weight percent of a pH regulator, 10-40 weight percent of a powder containing at least one metal selected from the group consisting of zinc, aluminum, zinc alloy and aluminum alloy, 7-30 weight percent of a low molecular weight glycol or oxohydroxyether, 0-4 weight percent of a surfactant and balance at least one fluid selected from the group consisting of water and water-miscible organic solvents.

2. The composition as claimed in claim 1, wherein said water-soluble chromic acid compound is selected from the group consisting of chromic anhydride, water-soluble chromic acid salts and water soluble dichromic acid salts, further wherein said lower molecular weight glycol or oxohydroxyether is selected from the group consisting of lower alkylene glycol compounds and diacetone alcohols, and further wherein the pH regulator is selected from the group consisting of oxides and hydroxides of an alkali metal, an alkaline earth metal, zinc or cadmium.

3. The composition as claimed in claim 2, wherein said water-soluble chromic acid compound is selected from the group consisting of chromic anhydride, calcium chromate, magnesium chromate, zinc dichromate, potassium dichromate and calcium dichromate, further wherein said low molecular weight glycol or oxohydroxyether is selected form the group consisting of ethylene glycol, propylene glycol, dipropylene glycol, diacetone alcohol and mixtures thereof, further wherein said pH regulator is selected from the group consisting of oxides and hydroxides of sodium, potassium, lithium, strontium, calcium, barium, magnesium, zinc or cadmium and further wherein said surfactant is a nonionic surfactant.

4. The composition as claimed in claim 3, wherein said metal powder is flaky.

5. The composition as claimed in claim 3, wherein said metal powder is present in the amount of 15-30 weight percent, wherein said metal salt is present in the amount of 1-6 weight percent, wherein the total content of the chromic acid compound and boric acid compound is 2-8 weight percent and further wherein said low molecular weight glycol or oxohydroxyether compound content is 12-20 weight percent.

6. The composition as claimed in claim 5, wherein the gram ion equivalent ratio of metal to chromate is 0.05-0.5.

7. The composition as claimed in claim 5, wherein the weight ratio of the chromic acid compound and boric acid compound to said metal powder is 0.08-0.5.

8. The composition as claimed in claim 1, which is supplied as a combination of a first container containing said water-soluble chromic acid compound, said at least one metal salt, said pH regulator and said fluid and a second container containing said metal powder and said low molecular weight glycol or oxohydroxyether.

9. The composition as claimed in claim 2, wherein said metal powder is flaky.

10. The composition as claimed in claim 2, wherein the content of said metal powder is 15-30 weight percent, the content of the metal salt is 1-6 weight percent, the total content of the chromic acid compound and boric acid compound is 2-8 weight percent and the low molecular weight glycol or oxohydroxyether compound content is 12-20 weight percent.

11. The composition as claimed in claim 3, wherein the content of said metal powder is 15-30 weight percent, the content of the metal salt is 1-6 weight percent; the total content of the chromic acid compound and boric acid compound is 2-8 weight percent and the low molecular weight glycol oxohydroxyether compound content is 12-20 weight percent.

12. An anticorrosion coating composition for metal comprising 1-12 weight percent of at least one metal salt selected from the group consisting of nickel salt and cobalt salt, 1-12 weight percent of a water-soluble chromic acid compound, 0-9 weight percent of a boric acid compound, 0-4 weight percent of a pH regulator, 10-40 weight percent of a powder containing at least one metal selected from the group consisting of zinc, aluminum, zinc alloy and aluminum alloy, 7-30 weight percent of a low molecular weight glycol or oxohydroxyether and 0-4 weight percent of a surfactant.

* * * * *